Patented Feb. 2, 1932

1,843,443

UNITED STATES PATENT OFFICE

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT

TREATMENT OF RUBBER

No Drawing. Application filed December 6, 1929. Serial No. 412,277.

This invention relates to the vulcanization of rubber and similar vulcanizable materials, and more particularly to the provision and use in rubber of new accelerators of vulcanization. It also relates to the product of such treatment.

It has been found that aliphatic aldehydes will react with polyalkylene polyamines to form accelerators of vulcanization. By polyalkylene polyamine is meant either a single polyalkylene polyamine or a mixture of a number of them, and includes the basic materials designated as polyethylene polyamine and polypropylene polyamine, prepared by reacting an alkylene dihalide with ammonia, as set forth in copending application Serial No. 375,577, filed July 2, 1929, as well as polyamylene and styrol polyamines similarly prepared. The reaction may be carried out, in the case of aldehydes containing more than one carbon atom in the molecule, with or without the use of acid, inorganic or organic. In the case of formaldehyde, however, the preparation of a methylated derivative of the polyamine which is also an accelerator, depends on the presence of an inorganic acid such as hydrochloric, while when organic acids, or no acids at all are used, the reaction is similar to that as in the case of the aldehydes containing more than one carbon atom in the molecule.

Illustrative of the invention is the following:

*Example 1.*—100 parts of smoked sheet rubber, 50 parts of carbon black, 2 parts of zinc oxide, 5 parts of pine tar, 2 parts of palm oil, 3.5 parts of sulphur and 1 part of butyraldehyde-polyethylene polyamine reaction product are mixed on the mill in the usual manner. This is vulcanized in a mold under 45# steam pressure for 45' and 75' and gives the following tensiles:

| Cure | Tensile strength (lbs. per sq. in.) |
|---|---|
| 45' at 45# | 3895 |
| 75' at 45# | 4020 |

The butaldehyde polyethylene polyamine reaction product is prepared as follows:

20 grms. of polyethylene polyamine, 45 grams of butaldehyde and 1.7 grams of 66% butyric acid are mixed and are heated under reflux. The heating is carried out in an oil bath which is kept at a temperature of from 120° to 140° C. The water formed in the reaction is removed by a trap and the unchanged butaldehyde runs back into the reaction mixture until the reaction is complete. The temperature of the reaction mixture rises slowly to 120° C. and is kept there for 5-6 hrs. The product is filtered and is ready for use.

*Example 2.*—100 parts of pale crepe rubber, 10 parts of zinc oxide, 3 parts of sulphur, and .5 part of heptaldehyde polyethylene polyamine reaction product is mixed on the mill in the usual way. This is vulcanized in a mold at 45 lbs. for 30' and 60' and is found to give the following tensiles:

| Cure | Tensiles |
|---|---|
| 30' at 45# | 4305 |
| 60' at 45# | 4255 |

The heptaldehyde polyethylene polyamine is prepared as follows:

10 grams of polyethylene polyamine, 62.5 grams of heptaldehyde and 2 grams of butyric acid are heated for one hour on a boiling water bath. The flask containing the reaction mixture is then immersed in an oil bath which is heated at 130-140° C. and is refluxed for 3 hrs. The reaction mixture is cooled, separated from the water and dried. The product is ready for use as an accelerator of vulcanization.

Instead of using butaldehyde or heptaldehyde other aliphatic aldehydes may be used for example formaldehyde, acetaldehyde, isobutaldehyde, propionaldehyde, valeryl aldehyde, iso-valeryl aldhyde, crotonaldehyde, aldol. The aldehyde derivatives of polyethylene polyamine function particularly well in tread stocks containing 1-3 parts of zinc oxide and at least about 25 parts of carbon black. The reaction products may be reacted with additional aldehyde to form the aldehyde derivatives thereof, for example butyraldehyde derivative of heptaldehyde-polyethylene polyamine condensation product, heptaldehyde derivative of butyraldehyde-polyethylene polyamine condensation product, butyraldehyde derivative of acetaldehyde-polyethylene polyamine condensation product, heptaldehyde derivative of acetaldehyde-polyethylene polyamine condensation product, and butyraldehyde and heptaldehyde derivatives of formaldehyde-polyethylene polyamine condensation product.

With the detailed disclosure above given it will be obvious that modifications will suggest themselves, for instance the methods may be varied as to the amounts of materials used; so may the time of reaction, the temperature of reaction, the pressure under which the reaction takes place and the medium in which it takes place and it is not desired to limit the invention otherwise than as set forth in the appended claims.

Having thus described my invention, what I claim and desire to protect by Letters Patent is:

1. A method of treating rubber which comprises incorporating with rubber the reaction product of a polyalkylene polyamine and an aliphatic aldehyde.

2. A method of treating rubber which comprising incorporating with rubber the reaction product of a polyalkylene polyamine and an aliphatic aldehyde, and subsequently vulcanizing the rubber.

3. A method of treating rubber which comprises incorporating with rubber the product resulting from the reaction in the presence of an acid of a polyalkylene polyamine and an aliphatic aldehyde containing 1–7 carbon atoms.

4. A method of treating rubber which comprises incorporating with rubber the product resulting from the reaction in the presence of an acid of a polyalkylene polyamine and an aliphatic aldehyde containing 1–7 carbon atoms, and subsequently vulcanizing the rubber.

5. A method of treating rubber which comprises incorporating with rubber the product resulting from the reaction in the presence of an aliphatic acid of a polyalkylene polyamine and an aliphatic aldehyde containing 1–7 carbon atoms.

6. A method of treating rubber which comprises incorporating with rubber the product resulting from the reaction in the presence of an aliphatic acid of a polyalkylene polyamine and an aliphatic aldehyde containing 1–7 carbon atoms, and subsequently vulcanizing the rubber.

7. A method of treating rubber which comprises incorporating with rubber the reaction product of polyethylene polyamine and an aliphatic aldehyde.

8. A method of treating rubber which comprises incorporating with rubber the reaction product of polyethylene polyamine and an aliphatic aldehyde, and subsequently vulcanizing the rubber.

9. A method of treating rubber which comprises incorporating with rubber the product resulting from the reaction in the presence of an acid of polyethylene polyamine and an aliphatic aldehyde containing 1–7 carbon atoms.

10. A method of treating rubber which comprises incorporating with rubber the product resulting from the reaction in the presence of an acid of polyethylene polyamine and an aliphatic aldehyde containing 1–7 carbon atoms, and subsequently vulcanizing the rubber.

11. A method of treating rubber which comprises incorporating with rubber the product resulting from the reaction in the presence of an aliphatic acid of polyethylene polyamine and an aliphatic aldehyde containing 1–7 carbon atoms.

12. A method of treating rubber which comprises incorporating with rubber the product resulting from the reaction in the presence of an aliphatic acid of polyethylene polyamine and an aliphatic aldehyde containing 1–7 carbon atoms, and subsequently vulcanizing the rubber.

13. A method of treating rubber which comprises incorporating with rubber the reaction product of a polyalkylene polyamine and heptaldehyde.

14. A method of treating rubber which comprises incorporating with rubber the reaction product of a polyalkylene polyamine and heptaldehyde, and subsequently vulcanizing the rubber.

15. A method of treating rubber which comprises incorporating with rubber the product resulting from the reaction in the presence of an acid of a polyakylene polyamine and heptaldehyde.

16. A method of treating rubber which comprises incorporating with rubber the product resulting from the reaction in the presence of an acid of a polyalkylene polyamine and heptaldehyde, and subsequently vulcanizing the rubber.

17. A method of treating rubber which comprises incorporating with rubber the product resulting from the reaction in the presence of butyric acid of a polyalkylene polyamine and heptaldehyde.

18. A method of treating rubber which comprises incorporating with rubber the product resulting from the reaction in the presence of butyric acid of a polyalkylene polyamine and heptaldehyde, and subsequently vulcanizing the rubber.

19. Rubber derived from rubber containing the reaction product of a polyalkylene polyamine and an aliphatic aldehyde.

20. Rubber derived from rubber containing the reaction product of polyethylene polyamine and an aliphatic aldehyde.

21. Vulcanized rubber derived from rubber containing the reaction product of a polyalkylene polyamine and an aliphatic aldehyde.

22. Vulcanized rubber derived from rubber containing the reaction product of polyethylene polyamine and an aliphatic aldehyde.

23. Rubber derived from rubber containing the reaction product of a polyalkylene polyamine and an aliphatic aldehyde containing 1 to 7 carbon atoms.

24. Vulcanized rubber derived from rubber containing the reaction product of a polyalkylene polyamine and an aliphatic aldehyde containing 1 to 7 carbon atoms.

25. A method of treating rubber which comprises incorporating with rubber an aldehyde derivative of the reaction product of a polyalkylene polyamine and an aliphatic aldehyde.

26. A method of treating rubber which comprises incorporating with rubber an aldehyde derivative of the reaction product of a polyalkylene polyamine and an aliphatic aldehyde, and subsequently vulcanizing the rubber.

27. Rubber derived from rubber containing an aldehyde derivative of the reaction product of a polyalkylene polyamine and an aliphatic aldehyde.

28. Vulcanized rubber derived from rubber containing an aldehyde derivative of the reaction product of a polyalkylene polyamine and an aliphatic aldehyde.

29. A method of treating rubber which comprises incorporating with rubber the product resulting from the reaction in the presence of butyric acid of a polyethylene polyamine and heptaldehyde.

30. A method of treating rubber which comprises incorporating with rubber the product resulting from the reaction in the presence of butyric acid of a polyethylene polyamine and heptaldehyde, and subsequently vulcanizing the rubber.

Signed at Passaic, county of Passaic, State of New Jersey, this 26th day of Nov., 1929.

SIDNEY M. CADWELL.